United States Patent Office 3,075,984
Patented Jan. 29, 1963

3,075,984
1 - [(LOWER - AROMATIC) - (LOWER - ALKYL)]-4-
[(LOWER-AROMATIC)-(LOWER - ALKYL)IMINO]-
1,4-DIHYDROQUINOLINES AND THEIR PREPARATION
Alexander R. Surrey, Albany, N.Y., assignor to Sterling Drug Inc., New York, N.Y., a corporation of Delaware
No Drawing. Filed May 9, 1958, Ser. No. 734,127
16 Claims. (Cl. 260—288)

This invention relates to compositions of matter of the class of basic quinoline derivatives, to their acid-addition salts, and to the preparation of these compounds.

The invention here resides in a composition of matter selected from the group consisting of: (a) 1-[(lower-aromatic) - lower - alkyl)] - 4 - [(lower-aromatic) - (lower-alkyl)imino]-1,4-dihydroquinolines; and, (b) acid-addition salts thereof.

The physical embodiments of my invention have been tested by standard chemotherapeutic evaluation procedures in mice and found to possess anthelmintic activity.

Among the compounds of my invention are those which in free base form are represented by the structural Formula I

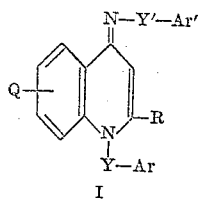

I where Q represents hydrogen or from one to two low molecular weight substituents at positions 3, 5, 6, 7 and 8 of the quinoline nucleus selected from the group consisting of halo, lower-alkoxy, lower-alkylmercapto, lower-alkyl, nitro and trifluoromethyl radicals; Y and Y′ each represent lower-alkylene radicals; Ar and Ar′ each represent lower-aromatic radicals including phenyl, naphthyl, biphenylyl, thienyl, furyl, pyridyl and pyrimidyl radicals; and R represents hydrogen or a lower-alkyl radical.

In the above general Formula I the quinoline nucleus can be unsubstituted at the positions other than 1 and 4 or it can be substituted further at one to two of the normally aromatic positions of the quinoline ring, namely, 3, 5, 6, 7 or 8, by the substituents named above. When Q represents two substituents, they can be the same or different and can be in any of said available aromatic positions relative to each other. The halo substituents can be chloro, bromo, iodo or fluoro. The lower-alkoxy, lower-alkylmercapto and lower-alkyl substituents have preferably from one to six carbon atoms and includes: methoxy, ethoxy, n-propoxy, isopropoxy, n-butoxy, iso-butoxy, 2-butoxy, n-pentoxy, n-hexoxy and the like when lower-alkoxy; methylmercapto, ethylmercapto, n-propylmercapto, isobutylmercapto, n-hexylmercapto and the like when lower-alkylmercapto; and methyl, ethyl, n-propyl, isopropyl, n-butyl, n-hexyl and the like when lower-alkyl.

The quinoline nucleus can be further substituted at the 2-position by a lower-alkyl radical represented above as R; the term "lower-alkyl," as used herein, means alkyl radicals having from one to six carbon atoms, inclusive, and is illustrated by methyl, ethyl, n-propyl, isobutyl, n-butyl, n-hexyl and the like.

The term "lower-alkylene," as used herein, means alkylene radicals having from one to four carbon atoms including

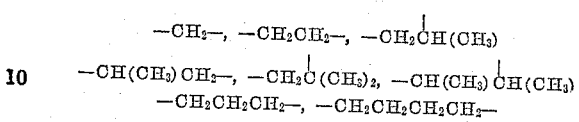

and the like.

The term "lower-aromatic," as used herein, means radicals having one or two aromatic rings each having from five to six ring-atoms which are carbocyclic or heterocyclic, as illustrated by phenyl, naphthyl, biphenylyl furyl, pyridyl and thienyl radicals. Ar and Ar′ preferably represent monocarbocyclic-aryl radicals having six ring-carbon atoms, i.e., aryl radicals of the benzene series. These embodiments, which are preferred primarily because of their commerical practicability due to availability of intermediates, include the unsubstituted-phenyl radical and phenyl radicals substituted by substituents including halo, nitro, lower-alkoxy, lower-alkyl, lower-alkylmercapto, lower-alkylsulfonyl, lower-alkylamino, di-(lower-alkyl)-amino, trifluoromethyl, lower-acylamino, and the like. The substituted-phenyl radicals have preferably from one to three substituents including those given above; and, furthermore, these substituents can be in any of the available positions of the phenyl nucleus, and where more than one substituent, they can be the same or different and they can be in any of the various position combinations relative to each other. Thus Ar and Ar′ each comprehend the unsubstituted-phenyl radical as well as substituted-phenyl radicals illustrated by: nitrophenyl radicals including 4-nitrophenyl, 3-nitrophenyl, 2-nitrophenyl, 2,4-dinitrophenyl, etc.; (lower-alkoxylated)-phenyl including 3-ethoxyphenyl, 2-methoxyphenyl, 2,4-dimethoxyphenyl, 2,4,6-trimethoxyphenyl, 3,4-diethoxyphenyl, etc.; (lower-alkylated)-phenyl including 4-methylphenyl, 3-ethylphenyl, 2-methylphenyl, 2,4-dimethylphenyl, 3,4,5-trimethylphenyl, 4-isopropylphenyl, etc.; halogenated-phenyl including 2-chlorophenyl, 4-chlorophenyl, 2,4-dibromophenyl, 3-iodophenyl, 2,4-dichlorophenyl, 3,4-dichlorophenyl, 2,4,6-trichlorophenyl, 4-fluorophenyl, etc.; and other substituted-phenyl radicals including 3-trifluoromethylphenyl, 4-methylmercaptophenyl, 4-methylsulfonylphenyl, 4-n-butylaminophenyl, 4-hydroxyphenyl, 4-diethylaminophenyl, 2-chloro-4-ethoxyphenyl, 4-acetylaminophenyl, and the like.

Particularly preferred embodiments of my invention are compounds of the above Formula I and their acid-addition salts of Formula II where Q represents a halo radical, R represents hydrogen, Y and Y′ each represent $CH_2$, and where the aryl radicals designated as Ar and Ar′ each represent a monocarbocyclic-aryl radical having six ring-carbon atoms, that is, an aryl radical of the benzene series, as defined and illustrated hereinabove, these particular embodiments being preferred because they possess in greater degree the applied use characteristics indicated in the specification.

Embodiments in the form of their acid-addition salts can be represented by the general structural Formula II

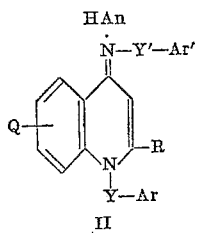

II where Q, Y', Ar', R, Y and Ar have the meanings designated above and An represents an anion.

The anion designated above as An can be any anion and is preferably a chemotherapeutically acceptable anion, for instance, chloride, bromide, iodide, sulfate, phosphate, sulfamate, benzenesulfonate, para-toluenesulfonate, methanesulfonate, ethanesulfonate, citrate, tartrate, and the like; the anion has no appreciable activity of its own in the high dilutions at which the acid-addition salts as a whole are effective. In particular, the anion appears to contribute nothing to the chemotherapeutic properties which inhere to the cation portion of the substituted -1,4-dihydroquinolines of the present invention. However, preferred compounds are those in which An represents halide, in particular, chloride, iodide or bromide, since these are derived from readily available starting materials. By a chemotherapeutically acceptable anion, I mean any anion which is innocuous to the animal organism in chemotherapeutic doses of the acid-addition salt, so that beneficial physiological properties inherent in the cation are not vitiated by any possible side-effects ascribable to the anions; in other words, the latter do not substantially affect the chemotherapeutic properties inherent in the cations.

The acid-addition salts are prepared directly as described hereinafter or they are prepared from the free base either by dissolving the free base in an aqueous alkanol solution containing the appropriate acid and isolating the salt by evaporating the solution if necessary, or by reacting the free base and acid in an organic solvent, e.g., lower alkanol, in which case the salt separates directly or can be obtained by concentration of the solution. Alternatively, the acid-addition salts can be prepared by treating an acid-addition salt (Formula II) prepared directly as noted above with an anion exchange resin saturated with the desired anion.

Although chemotherapeutically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a chemotherapeutically acceptable salt by ion exchange procedures.

Concerning the structure of the acid-addition salts represented above as Formula II, the following considerations are presented. From chemical and physical data it appears that structure II is actually a resonance hybrid whose main contributing structures are represented as follows by A↔B:

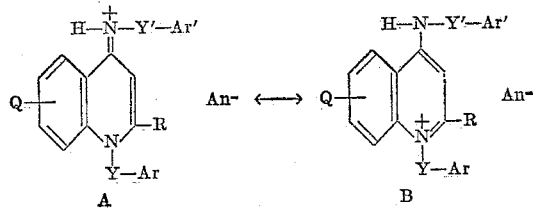

Since my compounds in free base form (Formula I) are readily obtained from their acid-addition salts by reaction with an acid-acceptor, as shown below, and since they are readily reconverted into their acid-addition salts by treatment with an acid, I prefer to represent the acid salt form by Formula II.

As an illustration, I prefer to represent the hydrochloride salt of 7-chloro-1-(2-chlorobenzyl)-4-(4-chlorobenzylimino)-1,4-dihydroquinoline by the following structural Formula IIa:

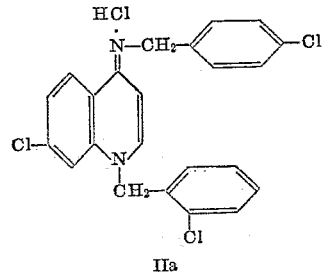

IIa

Alternatively, this compound can be named 7-chloro-1-(2-chlorobenzyl)-4-(4-chlorobenzylamino)quinolinium chloride or 7-chloro-4-(4-chlorobenzylamino)quinoline 2-chlorobenzochloride and can be represented by the structural Formula IIb:

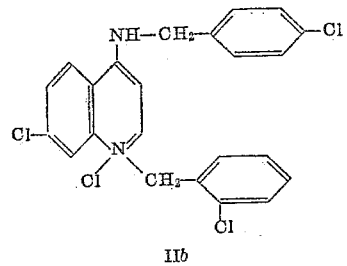

IIb

Thus, it is to be understood that although I prefer to represent the acid-addition salt form of my compounds by the structural formula designated above as II, i.e., as an acid-addition salt of a 1-[(lower-aromatic)-(lower-alkyl)]-4-[(lower-aromatic)-(lower-alkyl)imino] - 1,4 - dihydroquinoline, this 4-imino-1,4-dihydroquinoline structure actually represents only one of the contributing members of a resonance hybrid; and, further, it is to be understood that the salt form of my invention comprehends not only this 4-imino-1,4-dihydroquinoline structure (as specifically illustrated above as IIa) but also other contributing members of the resonance hybrid including the 1-[(lower-aromatic) - lower-alkyl)] - 4 - [(lower-aromatic) - (lower-alkyl)amino]-quinolinium salt structure (as specifically illustrated above as IIb).

The compounds of Formula II are conveniently prepared by reacting the corresponding 4-[(lower-aromatic)-(lower-alkyl)amino]-quinoline having the Formula III

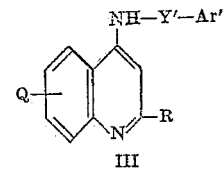

III where Q, Y', Ar' and R have the meanings designated above, with a (lower-aromatic)-(lower-alkyl) ester of the formula Ar—Y—An, where Ar, Y and An have the meanings given above, and, if the compounds of Formula I are desired, then reacting the resulting acid-addition salt of the 1-[(lower-aromatic)-(lower-alkyl)] - 4 - [(lower-aromatic)-(lower-alkyl)imino] - 1,4 - dihydroquinoline salt (Formula II above) with an acid-acceptor to yield the product in free base form (Formula I). Thus, the reaction of 7-chloro-4-(4-chlorobenzylamino)quinoline with benzyl chloride yields the hydrochloride of 1-benzyl-7-chloro-4-(4-chlorobenzylimino) - 1,4 - dihydroquinoline which when treated with an acid-acceptor yields 1-benzyl-7-chloro-4-(4-chlorobenzylimino)-1,4-dihydroquinoline.

The step of reacting the 4-[(lower-aromatic)-(lower-alkyl)amino]-quinoline (Formula III) with the ester Ar—Y—An is carried out preferably by heating the reactants between about 50° C. and 150° C., a particularly preferred range being between about 80° C. and 120° C. The reaction can be run below 50° C., but it takes longer. The reaction is carried out preferably in an organic solvent which is inert under the conditions of the reaction as for example, acetonitrile, acetone, ethanol, 2-propanol, and the like. When an inert solvent is used, the product usually separates from solution upon cooling, or can be obtained by concentration of the solution. The reaction takes place most readily with (lower-aromatic)-(lower-alkyl) esters Ar—Y—An where An represents the anion of a strong inorganic acid or an organic sulfonic acid. The chloride, bromide or iodide are preferred because of the more ready availability of the requisite (lower-aromatic) - (lower - alkyl) halides. Compounds where the anion An represents anions other than halogen or anions of strong acids can be prepared preferably by reacting the free base form of my compounds having Formula I with the appropriate acid according to the procedure described above.

The step of reacting the acid-addition salt of the 1-[(lower - aromatic) - (lower - alkyl)] - 4 - [(lower-aromatic) - (lower - alkyl)imino] - 1,4 - dihydroquinoline (Formula II) with an acid-acceptor is carried out at room temperature or by warming, if necessary. The reaction can be carried out in an aqueous or organic solvent; however, it is preferably carried out in an organic solvent inert under the conditions of the reaction as for example, anhydrous methanol, ethanol, and the like. The purpose of the acid-acceptor is to take up the hydrogen halide (or HAn) which is split out during the course of the reaction. The acid-acceptor is a basic substance which preferably forms freely water-soluble by-products easily separable from the product of the reaction, including for example, sodium hydroxide, potassium hydroxide, sodium carbonate, potassium carbonate, sodium acetate, sodium alkoxides, potassium alkoxides, sodium amide, and the like.

The compounds of Formulas I and II can also be prepared by reacting the corresponding 4-haloquinolinium halide having the Formula IV

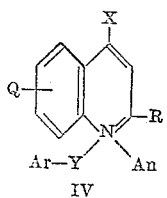

IV where Q, R, Y and Ar have the meanings designated above, An represents a halide ion and X represents a chloro, bromo or iodo radical, with a (lower-aromatic)-(lower-alkyl)amine of the formula Ar'—Y'—NH₂ and reacting the resulting HAn acid-addition salt (Formula II) with an acid-acceptor to yield the product in free base form (Formula I). Thus, the reaction of 7-bromo-1-(2 - chloro - 4 - ethoxybenzyl) - 4 - iodoquinolinium iodide with 2-bromobenzylamine yields the hydriodide of 7 - bromo - 4 - (2 - bromobenzylimino) - 1 - (2-chloro - 4 - ethoxybenzyl) - 1,4 - dihydroquinoline; and, the corresponding compound in free base form is obtained by treating the hydriodide salt with an acid-acceptor as described above.

The reaction of the 4-haloquinolinium halide (Formula IV) with a (lower - aromatic) - (lower - alkyl) - amine Ar'—Y'—NH₂ is carried out preferably by heating the reactants at a temperature between about 50° C. and 150° C., preferably between about 75 and 125° C.; the reaction can be run at room temperature, but it takes longer. The reaction is preferably carried out in an organic solvent which is inert under the conditions of the reaction as for example, ethanol, and the like. If an inert solvent is used, the product usually separates from solution upon cooling, or can be obtained by concentration of the solution.

The following examples will further illustrate the invention without, however, limiting it thereto.

EXAMPLE 1

A. 1-[(Lower-Aromatic)-(Lower-Alkyl)]-4-Haloquinolinium Halides

The preparation of these intermediates is illustrated by the following preparation of 7-chloro-1-(2-chlorobenzyl)-4-iodoquinolinium iodide:

A reaction mixture containing 80 g. of 4,7-dichloroquinoline, 128 g. of 2-chlorobenzyl chloride, 177 g. of sodium iodide and 1200 cc. of acetone was refluxed for twenty-four hours with stirring. The reaction mixture was allowed to cool and the precipitate was collected; washed successively with acetone, water and acetone. There was thus obtained 130 g. (60% yield) of 7-chloro-1-(2-chlorobenzyl)-4-iodoquinolinium iodide, M.P. 208–209° C. (uncorr.).

Following the above procedure using an equivalent quantity of 4,5-dichloroquinoline in place of 4,7-dichloroquinoline, the product obtained was 5-chloro-1-(2-chlorobenzyl)-4-iodoquinolinium iodide, M.P. 201–202° C. with decomposition.

*Analysis.*—Calcd. for $C_{16}H_{10}Cl_2IN \cdot HI$: C, 35.45; H, 2.04; I⁻, 23.42. Found: C, 35.28; H, 2.30; I⁻, 25.6.

Following the above procedure using an equivalent quantity of benzyl chloride in place of 2-chlorobenzyl chloride, the product obtained was 1-benzyl-7-chloro-4-iodoquinolinium iodide, M.P. 220–222° C. with decomposition.

*Analysis.* — Calcd. for $C_{16}H_{11}ClIN \cdot HI$: I, 50.1. Found: I, 48.79.

Following the above procedure in the absence of sodium iodide, 4,7-dichloroquinoline and 2-chlorobenzyl chloride react to form 1-(2-chlorobenzyl)-4,7-dichloroquinolinium chloride; use of 4,7-dibromoquinoline and 2-bromobenzyl bromide in the absence of sodium iodide yields 1 - (2 - bromobenzyl) - 4,7 - dibromoquinolinium bromide.

Other 1-[(lower-aromatic)-(lower-alkyl)]-4-haloquinolinium iodides that can be prepared following the above procedure using the appropriate 4-haloquinoline, (lower-aromatic)-(lower-alkyl)-halide and sodium iodide include: 3,7-dichloro-4-iodo-1-(3-nitrobenzyl)quinolinium iodide, 7-bromo-1-(2,4-dimethoxybenzyl) - 4 - iodoquinolinium iodide, 8-chloro-4-iodo-1-(2,4,6-trimethoxybenzyl)quinolinium iodide, 1-(3-ethylbenzyl)-4-iodo-7-trifluoromethylquinolinium iodide, 4-iodo-7-methylmercapto-1-(2-methylmercaptobenzyl)quinolinium iodide, 7-chloro-1 - [2 - (4 - chlorophenyl)ethyl]-4-iodo-2-methylquinolinium iodide, 1-(4-biphenylylmethyl)-7-chloro-4-iodoquinolinium iodide, 7-chloro-4-iodo-1-(2-thienylmethyl)quinolinium iodide, 7-chloro-1-(2-furylmethyl)-4-iodoquinolinium iodide, 7-chloro-4-iodo-1-(3-pyridylmethyl)quinolinium iodide, 7 - chloro - 4 - iodo-1-(2-pyrimidylmethyl)quinolinium iodide, 7-chloro-1-(4-dimethylaminobenzyl)-4-iodoquinolinium iodide, 7-chloro-4-iodo-1-(2-pyridylmethyl)quinolinium iodide, 7-chloro-4-iodo-1-(2-methoxybenzyl)quinolinium iodide, 6,7-dichloro-1-[2-(2,4-dimethoxyphenyl)ethyl]-4-iodoquinolinium iodide, 7 - bromo-1-(2-chloro-4-methoxybenzyl)-4-iodoquinolinium iodide, 1-[4-(4-chlorophenyl)butyl]-4-iodo-3-nitroquinolinium iodide, 6,8-dimethoxy-4-iodo-1-(2,4,6-trichlorobenzyl)quinolinium iodide, 8-n-butoxy-4-iodo-1-(3-trifluoromethylbenzyl)quinolinium iodide, 1-(4-n-butylmercaptobenzyl)-6-n-hexyloxy-4-iodoquinolinium iodide, 4 - iodo - 8 - isobutylmercapto-1-(3-phenylpropyl)quinolinium iodide, 7-chloro-4-iodo-6-methoxy-1-(4-n-propylsulfonylbenzyl)quinolinium iodide, 1-(4-n-butylaminobenzyl)-4-iodo-7-methylquinolinium iodide, 4,7-diiodo-1-

(4-iodobenzyl)quinolinium iodide, 7-chloro-4-iodo-1-(2-methylmercaptobenzyl)-3-nitroquinolinium iodide, 1-(2-chlorobenzyl)-4-iodoquinolinium iodide, 7-chloro-4-iodo-1-(2-naphthylmethyl)quinolinium iodide, and the like.

B. *1-[(Lower-Aromatic)-(Lower-Alkyl)]-4-[(Lower-Aromatic)-(Lower-Alkyl)Imino-1,4-Dihydroquinoline*

The preparation of these compounds by first reacting a 1-[(lower-aromatic)-(lower-alkyl)] - 4 - haloquinolinium halide with a (lower - aromatic) - (lower - alkyl) - amine Ar'—Y'—NH₂ is illustrated by the following preparation of 1-benzyl - 7 - chloro-4-(3-chlorobenzylimino)-1,4-dihydroquinoline hydriodide, free base and hydrochloride:

A mixture containing 7 g. of 1-benzyl-7-chloro-4-iodoquinolinium iodide, 6 g. of 3-chlorobenzylamine and 100 cc. of absolute ethanol was heated; the resulting hot solution was treated with decolorizing charcoal and filtered; and the filtrate was cooled to yield a crystalline precipitate. The precipitate was collected to give 7 g. (96% yield) of 1-benzyl-7-chloro-4-(3-chlorobenzyl-imino)-1,4-dihydroquinoline hydriodide, melting point 228–230° C.

The above hydriodide salt was converted into its free base form by suspending the salt in ethanol and treating the suspension with 5 cc. of 35% aqueous sodium hydroxide solution. The resulting solid was collected and recrystallized from isopropyl alcohol to yield 3 g. of 1-benzyl-7-chloro - 4 - (3 - chlorobenzylimino)-1,4-dihydroquinoline, melting point 108–109° C.

The hydrochloride salt was formed by dissolving the 1 - benzyl-7-chloro-4-(3-chlorobenzylimino)-1,4-dihydroquinoline base in ethanol and treating the ethanol solution with an excess of solution of hydrogen chloride in ethanol followed by addition of ether. The crystalline product that separated was collected to yield 2.7 g. of 1 - benzyl-7-chloro-4-(3-chlorobenzylimino)-1,4-dihydroquinoline hydrochloride, melting point 231.0–232.4° C. (corr.).

*Analysis.*—Calcd. for $C_{23}H_{18}Cl_2N_2 \cdot HCl$: Cl, 24.75; N, 6.50. Found: Cl, 24.60; N, 6.42.

Alternatively, as discussed hereinabove, 1-benzyl-7-chloro-4-(3-chlorobenzylimino) - 1,4 - dihydroquinoline hydrochloride can be called 1-benzyl-7-chloro-4-(3-chlorobenzylamino)quinolinium chloride.

Following the above procedure using 1-benzyl-4,7-dichloroquinolinium chloride in place of 1-benzyl-7-chloro-4-iodoquinolinium iodide, there is obtained directly 1-benzyl-7-chloro-4-(3-chlorobenzylimino) - 1,4 - dihydroquinoline hydrochloride; using 1-benzyl-4-bromo-7-chloroquinolinium bromide, there is 1-benzyl-7-chloro-4-(3-chlorobenzylimino)-1,4-dihydroquinoline hydrobromide.

Substitution of the hydrogen chloride in the above reaction with 1-benzyl-7-chloro-4-(3-chlorobenzylimino)-1,4-dihydroquinoline by hydrogen bromide, phosphoric acid, sulfuric acid, tartaric acid, sulfamic acid or methanesulfonic acid, there can be obtained 1-benzyl-7-chloro-4-(3-chlorobenzylimino) - 1,4 - dihydroquinoline hydrobromide, phosphate, sulfate, tartrate, sulfamate or methanesulfonate, respectively, instead of the hydrochloride.

EXAMPLE 2

1-benzyl-4-(4-bromobenzylimino) - 7 - chloro - 1,4 - dihydroquinoline hydriodide is obtained following the procedure described in Example 1(B) using 1-benzyl-7-chloro-4-iodoquinolinium iodide and 4-bromobenzylamine; and the hydriodide is then converted into the corresponding free base and hydrochloride.

Other 1-[(lower-aromatic)-(lower-alkyl)]-4-[(lower-aromatic)-(lower-alkyl)imino-1,4-dihydroquinolines that can be prepared following the above procedure in Example 1(B) for the preparation of 1-benzyl-7-chloro-4-(3-chlorobenzylimino)-1,4-dihydroquinoline and its hydrohalide salts using the appropriate 1-[(lower-aromatic)-(lower-alkyl)]-4-iodoquinolinium iodide and (lower-aromatic)-(lower-alkyl)amine include those compounds of Examples 3–31.

EXAMPLE 3

4-benzylimino - 3,7 - dichloro-1-(3-nitrobenzyl)-1,4-dihydroquinoline hydriodide is obtained using 3,4-dichloro-4-iodo-1-(3-nitrobenzyl)quinolinium iodide and benzylamine; and the hydriodide is then converted into the corresponding free base and hydrochloride.

EXAMPLE 4

7-chloro-1 - (2 - chlorobenzyl) - 4 - (3 - ethoxybenzylimino)-1,4-dihydroquinoline hydriodide is obtained using 7-chloro-1-(2-chlorobenzyl) - 4 - iodoquinolinium iodide and 3-ethoxybenzylamine; and the hydriodide is then converted into the corresponding free base and hydrochloride.

EXAMPLE 5

5-chloro-1-(2-chlorobenzyl)-4-(2,4,6 - trimethoxybenzylimino)-1,4-dihydroquinoline hydriodide is obtained using 5-chloro-1-(2-chlorobenzyl)-4-iodoquinolinium iodide and 2,4,6-trimethoxybenzylamine; and the hydriodide is then converted into the corresponding free base and hydrochloride.

EXAMPLE 6

7-bromo - 1 - (2,4 - dimethoxybenzyl) - 4 - (2 - fluorobenzylimino)-1,4-dihydroquinoline hydriodide is obtained using 7-bromo-4-iodo - 1 - (2,4 - dimethoxybenzyl)quinolinium iodide and 2-fluorobenzylamine, and the hydriodide is then converted into the corresponding free base and hydrochloride.

EXAMPLE 7

4-(2 - bromobenzylimino) - 8 - chloro - 1 - (2,4,6-trimethoxybenzyl)-1,4-dihydroquinoline hydriodide is obtained using 8-chloro-4-iodo-1-(2,4,6-trimethoxybenzyl)-quinolinium iodide and 2-bromobenzylamine; and the hydriodide is then converted into the corresponding free base and hydrochloride.

EXAMPLE 8

1-(3 - ethylbenzyl) - 4 - (3 - iodobenzylimino)-7-trifluoromethyl-1,4-dihydroquinoline hydriodide is obtained using 1 - (3 - ethylbenzyl)-4-iodo-7-trifluoromethylquinolinium iodide and 3-iodobenzylamine; and the hydriodide is then converted into the corresponding free base and hydrochloride.

EXAMPLE 9

4-(2 - chlorobenzylimino) - 7 - methylmercapto-1-(2-methylmercaptobenzyl)-1,4-dihydroquinoline hydriodide is obtained using 4-iodo-7-methylmercapto-1-(2-methylmercaptobenzyl)quinolinium iodide and 2-chlorobenzylamine; and the hydriodide is then converted into the corresponding free base and hydrochloride.

EXAMPLE 10

7-chloro - 1 - [2 - (4 - chlorophenyl)ethyl] - 2 - methyl-4-(2 - naphthylmethylimino) - 1,4 - dihydroquinoline hydriodide is obtained using 7-chloro-1-[2-(4-chlorophenyl)ethyl]-4-iodo-2-methylquinolinium iodide and 2-naphthylmethylamine; and the hydriodide is then converted into the corresponding free base and hydrochloride.

EXAMPLE 11

1-(4 - biphenylylmethyl) - 7 - chloro - 4 - (4 - methylbenzylimino)-1,4-dihydroquinoline hydriodide is obtained using 1-(4-biphenylylmethyl)-7-chloro-4-iodoquinolinium iodide and 4-methylbenzylamine; and the hydriodide is then converted into the corresponding free base and hydrochloride.

EXAMPLE 12

4-(3 - ethylbenzylimino) - 7 - chloro - 1 -(2 - thienylmethyl)-1,4-dihydroquinoline hydriodide is obtained using 7-chloro-4-iodo - 1 - (2 - thienylmethyl)quinolinium

EXAMPLE 13

7-chloro - 4 - (2,4 - dimethylbenzylimino) - 1 - (2-furylmethyl) - 1,4 - dihydroquinoline hydriodide is obtained using 7-chloro-1-(2 - furylmethyl) - 4 - iodoquinolinium iodide and 2,4-dimethylbenzylamine; and the hydriodide is then converted into the corresponding free base and hydrochloride.

EXAMPLE 14

7-chloro - 1 - (3 - pyridylmethyl) - 4 - (3,4,5-trimethylbenzylimino)-1,4-dihydroquinoline hydriodide is obtained using 7-chloro-4-iodo-1 - (3 - pyridylmethyl)quinolinium iodide and 3,4,5-trimethylbenzylamine; and the hydriodide is then converted into the corresponding free base and hydrochloride.

EXAMPLE 15

7-chloro - 4 - (2 - chlorobenzylimino) - 1 - (2-pyrimidylmethyl)-1,4-dihydroquinoline hydriodide is obtained using 7-chloro-4-iodo-1-(2 - pyrimidylmethyl)quinolinium iodide and 2-chlorobenzylamine; and the hydriodide is then converted into the corresponding free base and hydrochloride.

EXAMPLE 16

7-chloro - 1 - (4 - dimethylaminobenzyl) - 4 - (4 - isopropylbenzylimino)-1,4 - dihydroquinoline hydriodide is obtained using 7-chloro-1 - (4 - dimethylaminobenzyl)-4-iodoquinolinium iodide and 4-isopropylbenzylamine; and the hydriodide is then converted into the corresponding free base and hydrochloride.

EXAMPLE 17

7-chloro - 4 - (4 - diethylaminobenzylimino) - 1 - (2-pyridylmethyl)-1,4-dihydroquinoline hydriodide is obtained using 7-chloro-4-iodo-1-(2-pyridylmethyl)quinolinium iodide and 4-diethylaminobenzylamine; and the hydriodide is then converted into the corresponding free base and hydrochloride.

EXAMPLE 18

4 - (4 - biphenylmethylimino) - 7 - chloro-1-(2-methoxybenzyl)-1,4-dihydroquinoline hydriodide is obtained using 7-chloro-4-iodo-1 - (2 - methoxybenzyl)quinolinium iodide and 4-biphenylmethylamine; and the hydriodide is then converted into the corresponding free base and hydrochloride.

EXAMPLE 19

6,7-dichloro-1 - [2 - (2,4 - dimethoxyphenyl)ethyl]-4-(2-thienylmethylimino)-1,4 - dihydroquinoline hydriodide is obtained using 6,7-dichloro-1-[2-(2,4-dimethoxyphenyl)ethyl]-4-iodoquinolinium iodide and 2-thienylmethylamine; and the hydriodide is then converted into the corresponding free base and hydrochloride.

EXAMPLE 20

7-bromo - 1 - (2 - chloro - 4 - methoxyphenyl)-4-(2-furylmethylimino)-1,4-dihydroquinoline hydriodide is obtained using 7-bromo-1-(2-chloro - 4 - methoxyphenyl)-4-iodoquinolinium iodide and 2-furylmethylamine; and the hydriodide is then converted into the corresponding free base and hydrochloride.

EXAMPLE 21

1 - [4 - (4 - chlorophenyl)butyl] - 3 - nitro - 4 - (3 - pyridylmethylimino)-1,4-dihydroquinoline hydriodide is obtained using 1-[4-(4-chlorophenyl)butyl]-4-iodo-3-nitroquinolinium iodide and 3-pyridylmethylamine; and the hydriodide is then converted into the corresponding free base and hydrochloride.

EXAMPLE 22

6,8-dimethoxy - 4 - (2 - methylmercaptobenzylimino)-1-(2,4,6 - trichlorobenzyl) - 1,4 - dihydroquinoline hydriodide is obtained using 6,8-dimethoxy-4-iodo-1-(2,4,6-trichlorobenzyl)quinolinium iodide and 2-methylmercaptobenzylamine; and the hydriodide is then converted into the corresponding free base and hydrochloride.

EXAMPLE 23

8-n-butoxy - 4 - (2 - pyrimidylmethylimino) - 1-(3-trifluoromethylbenzyl)-1,4-dihydroquinoline hydriodide is obtained using 8-n-butoxy-4-iodo-1 - (3 - trifluoromethylbenzyl)quinolinium iodide and 2-pyrimidylmethylamine; and the hydriodide is then converted into the corresponding free base and hydrochloride.

EXAMPLE 24

4-(4-n-butylaminobenzylimino) - 1 - (4-n-butylmercaptobenzyl)-6-n-hexyloxy-1,4 - dihydroquinoline hydriodide is obtained using 1-(4-n-butylmercaptobenzyl)-6-n-hexyloxy-4-iodoquinolinium iodide and 4-n-butylaminobenzylamine; and the hydriodide is then converted into the corresponding free base and hydrochloride.

EXAMPLE 25

8 - isobutylmercapto-1-(3-phenylpropyl) - 4 - (2,4,6-trichlorobenzylimino)-1,4-dihydroquinoline hydriodide is obtained using 4-iodo-8-isobutylmercapto-1-(3-phenylpropyl)-quinolinium iodide and 2,4,6-trichlorobenzylamine; and the hydriodide is then converted into the corresponding free base and hydrochloride.

EXAMPLE 26

7-chloro - 6 - methoxy-4-(2-nitrobenzylimino)-1 - (4-n-propylsulfonylbenzyl)-1,4-dihydroquinoline hydriode is obtained using 7-chloro-4-iodo-6-methoxy-1-(4-n-propylsulfonylbenzyl)quinolinium iodide and 2-nitrobenzylamine; and the hydriodide is then converted into the corresponding free base and hydrochloride.

EXAMPLE 27

1-(4-n-butylaminobenzyl) - 4 - (2-iodobenzylimino)-7-methyl-1,4-dihydroquinoline hydriodide is obtained using 1-(4-n-butylaminobenzyl) - 4 - iodo-7-methylquinolinium iodide and 2-iodobenzylamine; and the hydriodide is then converted into the corresponding free base and hydrochloride.

EXAMPLE 28

4-(2-chloro-4-ethoxybenzylimino) - 7 - iodo-1-(4-iodobenzyl)-1,4-dihydroquinoline hydriodide is obtained using 4,7-diiodo-1-(4-iodobenzyl)quinolinium iodide and 2-chloro-4-ethoxybenzylamine; and the hydriodide is then converted into the corresponding free base and hydrochloride.

EXAMPLE 29

4-(4-acetylaminobenzylimino) - 7 - chloro-1-(2methylmercaptobenzyl)-3-nitro-1,4-dihydroquinoline hydriodide is obtained using 7-chloro-4-iodo-1-(2-methylmercaptobenzyl)-3-nitroquinolinium iodide and 4-acetylaminobenzylamine; and the hydriodide is then converted into the corresponding free base and hydrochloride.

EXAMPLE 30

1-(2-chlorobenzyl)-4 - (4-methylsulfonylbenzylimino)-1,4-dihydroquinoline hydriodide is obtained using 1-(2-chlorobenzyl)-4-iodoquinolinium iodide and 4-methylsulfonylbenzylamine; and the hydriodide is then converted into the corresponding free base and hydrochloride.

EXAMPLE 31

7-chloro-1-(2-naphthylmethyl) - 4 - (3-trifluoromethylbenzylimino)-1,4-dihydroquinoline hydriodide is obtained using 7-chloro-4-iodo - 1 - (2-naphthylmethyl)quinolinium iodide and 3-trifluoromethylbenzylamine; and the hydriodide is then converted into the corresponding free base and hydrochloride.

EXAMPLE 32

4-benzylimino-7-chloro-1-(2-chlorobenzyl)-1,4-dihydroquinoline hydrochloride is obtained following the procedure described in Example 1(B), using 1-(2-chlorobenzyl)-4,7-dichloroquinolinium chloride and benzylamine.

EXAMPLE 33

7-bromo-1-(2-bromobenzyl) - 4-(2-phenylethylimino)-1,4-dihydroquinoline hydrobromide is obtained following the procedure described in Example 1(B) using 1-(2-bromobenzyl)-4,7-dibromoquinolinium bromide and 2-phenylethylamine.

EXAMPLE 34

*1-Benzyl-4-Benzylimino-7-Chloro-1,4-Dihydroquinoline and Salts*

Following the procedure described in Example 1(B) using 13.5 g. of 1-benzyl-7-chloro-4-iodoquinolinium iodide, 17.3 g. of benzylamine and 100 cc. of absolute ethanol, there was first obtained 12.5 g. (95% yield) of 1-benzyl-4-benzylimino-7-chloro-1,4-dihydroquinoline hydriodide, M.P. 212–215° C. This hydriodide salt in ethanol solution was heated with excess 35% aqueous sodium hydrioxide solution as in Example 1(B) to yield 10.5 g. (81% yield) of 1-benzyl-4-benzylimino-7-chloro-1,4-dihydroquinoline, M.P. 123–125° C. This free base form was then dissolved in ethanol and the resulting solution treated with a solution of hydrogen chloride in ethanol as in Example 1(B) to yield 8.5 g. of 1-benzyl-4-benzylimino-7-chloro-1,4-dihydroquinoline hydrochloride, M.P. 249.6–255.6° C. (corr.) when recrystallized from isopropyl alcohol-absolute ethanol.

*Analysis.*—Calcd. for $C_{23}H_{19}ClN_2 \cdot HCl$: $Cl^-$, 8.99; N, 7.09. Found: $Cl^-$, 8.80; N, 6.96.

EXAMPLE 35

*1-Benzyl-7-Chloro-4-(3,4-Dichlorobenzylimino)-1,4-Dihydroquinoline and Salts*

This preparation was carried out following the procedure described in Example 1(B) using 10 g. of 1-benzyl-7-chloro-4-iodoquinolinium iodide, 11.6 g. of 3,4-dichlorobenzylamine and 100 cc. of absolute ethanol. There was first obtained 12 g. (98% yield) of 1-benzyl-7-chloro-4-(3,4-dichlorobenzylimino)-1,4-dihydroquinoline hydriode, M.P. 257–259° C. The hydriodide salt dissolved in ethanol was treated with 5 cc. of 35% aqueous sodium hydroxide as in Example 1(B) to give 9 g. of 1-benzyl-7-chloro-4-(3,4-dichlorobenzylimino) - 1,4-dihydroquinoline which was recrystallized from ethanol to yield 7 g. of the purified base, M.P. 138–139° C. The base was then converted into 1-benzyl-7-chloro-4-(3,4-dichlorobenzylimino)-1,4-dihydroquinoline hydrochloride, M.P. 223.4–224.6° C. (corr.).

*Analysis.*—Calcd. for $C_{23}H_{17}Cl_3N_2 \cdot HCl$: Cl, 30.59; N, 6.04. Found: Cl, 30.40; N, 5.95.

EXAMPLE 36

*1-Benzyl-7-Chloro-4-[2-(4-Chlorophenyl)Ethylimino]-1,4-Dihydroquinoline and Salts*

Following the procedure described in Example 1(B) using 10 g. of 1-benzyl-7-chloro-4-iodoquinolinium iodide, 13. g. of 2-(4-chlorophenyl)ethylamine hydrochloride, 3.8 g. of potassium hydroxide (to neutralize the HCl of the 2-(4-chlorophenyl)ethylamine hydrochloride) and 100 cc. of ethanol, there was obtained 1-benzyl-7-chloro-4-[2-(4-chlorophenyl)ethylimino] - 1,4 - dihydroquinoline hydriodide. The hydriodide when treated as in Example 1(B) yielded 7.5 g. of 1-benzyl-7-chloro-4-[2-(4-chlorophenyl)ethylimino]-1,4-dihydroquinoline, which was then converted into 1-benzyl-7-chloro-4-[2-(4-chlorophenyl)-ethylimino] - 1,4-dihydroquinoline hydrochloride, M.P. 288.0–292.2° C. (corr.), when recrystallized from absolute ethanol.

*Analysis.*—Calcd. for $C_{24}H_{20}Cl_2N_2 \cdot HCl$: Cl, 24.00; N, 6.31. Found: Cl, 23.95; N, 6.30.

EXAMPLE 37

*7-Chloro-1-(2-Chlorobenzyl)-4-(2-Chlorobenzylimino)-1,4-Dihydroquinoline and Salts*

Following the procedure described in Example 1(B) using 5.4 g. of 7-chloro-1-(2-chlorobenzyl)-4-iodoquinolinium iodide, 7.1 g. of 2-chlorobenzylamine and 100 cc. of ethanol, there was first obtained 6 g. of 7-chloro-1-(2-chlorobenzyl)-4-(2-chlorobenzylimino)-1,4-dihydroquinoline hydriodide, M.P. 253–257° C., with decomposition. The hydriodide salt was converted, as in Example 1(B), to 7-chloro-1-(2-chlorobenzyl)-4-(2-chlorobenzylimino)-1,4-dihydroquinoline, M.P. 133.6–135.4° C. (corr.).

*Analysis.*—Calcd. for $C_{23}H_{17}Cl_3N_2$: Cl, 24.90; N, 6.55. Found: Cl, 24.75; N, 6.60.

Treatment of the above imino base in ethanol solution with a solution of hydrogen chloride in ethanol as in Example 1(B) yielded 3 g. of 7-chloro-1-(2-chlorobenzyl)-4-(2 - chlorobenzylimino)-1,4-dihydroquinoline hydrochloride, M.P. 251.2–255.2° C. (corr.) when recrystallized from absolute ethanol.

*Analysis.*—Calcd. for $C_{23}H_{17}Cl_3N_2 \cdot HCl$: $Cl^-$, 7.65; N, 6.05. Found: $Cl^-$, 7.44; N, 6.30.

EXAMPLE 38

*7 - Chloro - 1 - (2 - Chlorobenzyl)-4-(2,4-Dichlorobenzylimino)-1,4-Dihydroquinoline and Salts*

Following the procedure described in Example 1(B) using 5.4 g. of 7-chloro-1-(2-chlorobenzyl)-4-iodoquinolinium iodide, 7.0 g. of 2,4-dichlorobenzylamine and 100 cc. of absolute ethanol, there was first obtained 6.5 g. of 7 - chloro-1-(2-chlorobenzyl)-4-(2,4-dichlorobenzylimino)1,4-dihydroquinoline hydriodide, which was converted into 6 g. of 7-chloro-1-(2-chlorobenzyl)-4-(2,4-dichlorobenzylimino)-1,4-dihydroquinoline, M.P. 159.6–161.4° C. (corr.), when recrystallized from absolute ethanol.

*Analysis.*—Calcd. for $C_{23}H_{16}Cl_4N_2$: $N_K$, 6.07; $N_{AP}$, 3.04. Found: $N_K$, 5.99; $N_{AP}$, 3.01.

Reaction of the above imino base with hydrogen chloride as in Example 1(B) yielded 7-chloro-1-(2-chlorobenzyl) - 4 - (2,4 - dichlorobenzylimino)-1,4-dihydroquinoline hydrochloride, M.P. 268.4–271.0° C. (corr.) when recrystallized from ethanol.

*Analysis.*—Calcd. for $C_{23}H_{16}Cl_4N_2 \cdot HCl$: Cl, 7.12; N, 5.61. Found: Cl, 7.00; N, 5.58.

EXAMPLE 39

*7 - Chloro-1-(2-Chlorobenzyl)-4-(4-Chlorobenzylimino)-1,4-Dihydroquinoline and Salts*

Following the procedure described in Example 1(B) using 5.4 g. of 7-chloro-1-(2-chlorobenzyl)-4-iodoquinolinium iodide, 7 g. of 4-chlorobenzylamine and 100 cc. of absolute ethanol, there was first obtained 4.8 g. of 7-chloro-1-(2-chlorobenzyl)-4-(4-chlorobenzylimino) - 1,4-dihydroquinoline hydriodide, which was then converted into 2.9 g. of 7-chloro-1-(2-chlorobenzyl)-4-(4-chlorobenzylimino)-1,4-dihydroquinoline, M.P. 155.4–156.8° C. (corr.) when recrystallized from absolute ethanol.

*Analysis.*—Calcd. for $C_{23}H_{17}Cl_3N_2$: Cl, 24.90; N, 6.56. Found: Cl, 25.85; N, 6.54.

Reaction of the above imino base with hydrogen chloride as in Example 1(B) yields 7-chloro-1-(2-chlorobenzyl) - 4 - (4-chlorobenzylimino)-1,4-dihydroquinoline hydrochloride.

EXAMPLE 40

*5-Chloro-1-(2-Chlorobenzyl) - 4 - (2,4-Dichlorobenzylimino)-1,4-Dihydroquinoline and Salts*

Following the procedure described in Example 1(B) using 23 g. of 5-chloro-1-(2-chlorobenzyl)-4-iodoquinolinium iodide, 30 g. of 2,4-dichlorobenzylamine and 300 cc. of absolute ethanol, there was first obtained 27 g. of 5-chloro-1-(2-chlorobenzyl)-4-(2,4-dichlorobenzylimino)-1,4-dihydroquinoline hydriodide, M.P. 232–234° C. with decomposition. The hydriodide was converted as in Example 1(B) to 5-chloro-1-(2-chlorobenzyl)-4-(2,4-dichlorobenzylimino)-1,4-dihydroquinoline, M.P. 155–157° C. The imino base was then converted into the hydrochloride salt, M.P. 238.6–246.8° C. (corr.) when recrystallized twice from isopropyl alcohol and once from methanol.

Analysis.—Calcd. for $C_{23}H_{16}Cl_4N_2 \cdot HCl$: Cl⁻, 7.12; N, 5.61. Found: Cl⁻, 6.93; N, 5.48.

EXAMPLE 41

*7-Chloro - 1 - (2-Chlorobenzyl)-4-[2-(4-Methylphenyl) Ethylimino]-1,4-Dihydroquinoline and Salts*

Following the procedure described in Example 1(B) using 5.4 g. of 7-chloro-1-(2-chlorobenzyl)-4-iodoquinolinium iodide, 4.1 g. of 2-(4-methylphenyl)ethylamine and 75 cc. of ethanol, there was obtained 4.9 g. of 7-chloro-1 - (2-chlorobenzyl)-4-[2-(4-methylphenyl)ethylimino]-1,4-dihydroquinoline hydriodide, which was converted into 2.7 g. of the corresponding imino base, 7-chloro-1-(2-chlorobenzyl) - 4 - [2-(4-methylphenyl)ethylimino]-1,4-dihydroquinoline, M.P. 153.8–155.0° C. (corr.).

Analysis.—Calcd. for $C_{25}H_{22}Cl_2N_2$: Cl, 16.83; N, 6.65. Found Cl, 16.78; N, 6.66.

The imino base is converted into its corresponding hydrochloride salt following the procedure described in Example 1(B).

EXAMPLE 42

*7-Chloro-1-(2-Chlorobenzyl) - 4 - (3,4-Methylenedioxybenzylimino)-1,4-Dihydroquinoline and Salts*

Following the procedure described in Example 1(B) using 5.4 g. of 7-chloro-1-(2-chlorobenzyl)-4-iodoquinolinium iodide, 4.5 g. of 3,4-methylenedioxybenzylamine and 75 cc. of ethanol, there was obtained 5.3 g. of 7-chloro-1-(2-chlorobenzyl)-4-(3,4-methylenedioxybenzylimino)-1,4-dihydroquinoline hydriodide, which was then converted into 2.5 g. of 7-chloro-1-(2-chlorobenzyl)-4 - (3,4 - methylenedioxybenzylimino) - 1,4 - dihydroquinoline, M.P. 124.8–126.2° C. (corr.) when recrystallized from ethanol.

Analysis.—Calcd. for $C_{24}H_{18}Cl_2N_2O_2$: Cl, 16.22; N, 6.41. Found: Cl, 16.11; N, 6.45.

7-chloro-1-(2-chlorobenzyl) - 4 - (3,4-methylenedioxybenzylimino)-1,4-dihydroquinoline hydrochloride is obtained by treating a solution of the above imino base in isopropyl alcohol with a solution of hydrogen chloride in isopropyl alcohol as in Example 1(B).

EXAMPLE 43

A. *4 - [(Lower-Aromatic)-(Lower-Alkyl)Amino] Quinolines*

The preparation of these intermediate compounds is illustrated by the following synthesis of 7-chloro-4-(4-chlorobenzylamino)quinoline:

A mixture containing 40 g. of 4,7-dichloroquinoline, 51 g. of 4-chlorobenzylamine and 80 g. of phenol was heated with stirring at about 120° C. for about fifteen hours. The reaction mixture was cooled, treated with 35% aqueous sodium hydroxide solution until strongly basic, diluted with an equal volume of water and cooled. The resulting precipitate was collected and recrystallized from ethanol to yield 49 g. (81% yield) of 7-chloro-4-(4-chlorobenzylamino)quinoline, M.P. 185–187° C. A sample recrystallized a second time from methanol and melting at 186.2–188.4° C. (corr.) was submitted for analysis.

Analysis.—Calcd. for $C_{16}H_{12}Cl_2N_2$: Cl, 23.40; N, 9.25. Found Cl, 23,28; N, 9.20.

Following the above procedure but using 25 g. of 4-chloro-2-methylquinoline, 35 g. of 4-chlorobenzylamine and 60 g. of phenol, there was obtained 4-(4-chlorobenzylamino)-2-methylquinoline, M.P. 178.4–182.6° C. (corr.) when recrystallized from benzene.

Analysis.—Calcd. for $C_{17}H_{15}ClN_2$: Cl, 12.54; N, 9.91. Found: Cl, 12.69; N, 9.99.

Following the above procedure but using 22 g. of 4,7-dichloroquinoline, 60 g. of 2,4-dichlorobenzylamine and no phenol, there was obtained 5.5 g. of 7-chloro-4-(2,4-dichlorobenzylamino)quinoline, M.P. 210.2–213.0° C. (corr.) when recrystallized twice from ethanol-dimethylforamide and once from dimethylformamide-water.

Analysis.—Calcd. for $C_{16}H_{11}Cl_3N_2$: C, 56.93; H, 3.23; N, 4.15. Found: C, 56.98; H, 3.21; N, 4.26.

Following the above procedure used for the preparation of 7-chloro-4-(4-chlorobenzylamino)quinoline using 4-fluorobenzylamine, 1-naphthylmethylamine, 4-biphenylylmethylamine, 2 - thienylmethylamine, 2 - furylmethylamine, 5-chloro-2-pyridylmethylamine, 2-pyrimidylmethylamine or 4-(4-chlorophenyl)-butylamine in place of 4-chlorobenzylamine, there is obtained, respectively, 7-chloro-4-(4-fluorobenzylamino)quinoline, 7-chloro-4-(1-naphthylmethylamino)quinoline, 4-(4-biphenylylmethylamino)-7-chloroquinoline, 7-chloro-4-(2-thienylmethylamino)quinoline, 7-chloro-4-(2-furylmethylamino-quinoline, 7-chloro-4-(5-chloro-2-pyridylmethylamino)quinoline, 7-chloro-4-(2-pyrimidylmethylamino)quinoline or 7-chloro-4-[4-(4-chlorophenyl)-butylamino]quinoline.

Other 4-[(lower-aromatic)-(lower-alkyl)amino]-quinolines that can be prepared following the above procedure for the preparation of 7-chloro-4-(4-chlorobenzylamino)quinoline using the appropriate 4-chloro-, 4-bromo- or 4-iodoquinoline and aromatic-alkylamine include: 4-(4-n-butoxybenzylamino)-6,7-dichloroquinoline, 3-nitro-4-(4-n-propylsulfonylbenzylamino)quinoline, 7-chloro-4-(2-methylmercaptobenzylamino)-3-nitroquinoline, 4-(2-chloro-4-n-propoxybenzylamino)-7 - trifluoromethylquinoline, 4 - (4 - n-amylaminobenzylamino)-6,8-dimethoxyquinoline, 7-methylmercapto-4-(3-trifluoromethylbenzylamino)quinoline, 7 - methyl-4-(4-propionylaminobenzylamino)quinoline, and the like.

B. *1-[Aromatic-(Lower-Alkyl)]-4-[Aromatic-(Lower-Alkyl)-Imino]-1,4-Dihydroquinolines*

The preparation of these compounds by reacting a 4-[aromatic-(lower-alkyl)-imino]-quinoline with an aromatic-(lower-alkyl) ester of a strong acid designated above as Ar—Y—An is illustrated by the following preparation of 7-chloro-1-(2,4-dichlorobenzyl)-4-(2,4-dichlorobenzylimino)-1,4-dihydroquinoline hydrochloride:

A mixture containing 10 g. of 7-chloro-4-(2,4-dichlorobenzylamino)quinoline, 30 g. of 2,4-dichlorobenzyl chloride and 200 cc. of acetonitrile was refluxed with stirring for about fifteen hours. The reaction mixture was allowed to cool and the precipitate that separated was collected and recrystallized from ethanol to give 11 g. (69% yield) of 7-chloro-1-(2,4-dichloro-benzyl)4-(2,4-dichlorobenzylimino)-1,4-dihydroquinoline hydrochloride, M.P. 244.6–247.4° C. (corr.).

Analysis.—Calcd. for $C_{23}H_{15}Cl_5N_2 \cdot HCl$: Cl, 39.96; N, 5.25. Found: Cl, 39.85; N, 5.17.

To a cooled solution containing 9 g. of 7-chloro-1-(2,4-dichlorobenzyl)-4-(2,4-dichlorobenzylimino)-1,4-dihydroquinoline hydrochloride in 250 cc. of ethanol and 50 cc. of water was added 25 cc. of 5% aqueous sodium hydroxide solution. Another 50 cc. of water was added and the precipitate was collected and recrystallized twice from benzene to yield 4 g. of 7-chloro-1-(2,4-dichlorobenzyl)-4-(2,4-dichlorobenzylamino)-1,4-dihydroquinoline, M.P. 167.4–173.2° C. (corr.).

Analysis.—Calcd. for $C_{23}H_{15}Cl_5N_2$: Cl, 35.74; N, 5.63. Found: Cl, 36.09; N, 5.86.

EXAMPLE 44

*7-Chloro-1-(4-Chlorobenzyl)-4-(4-Chlorobenzylimino)-1,4-Dihydroquinoline Hydrochloride*

Following the procedure described in Example 43(B)

using 9 g. of 7-chloro-4-(4-chlorobenzylamino)quinoline, 24 g. of 4-chlorobenzyl chloride and 200 cc. of acetonitrile, there was obtained 9.3 g. of 7-chloro-1-(4-chlorobenzyl)-4-(4-chlorobenzylimino)-1,4 - dihydroquinoline hydrochloride, M.P. 264.2–271.2° C. (corr.).

*Analysis.*—Calcd. for $C_{23}H_{17}Cl_3N_2.HCl$: $Cl^-$, 7.65; N, 6.04. Found: $Cl^-$, 7.46; N, 6.03.

7-chloro-1-(4-chlorobenzyl-4-(4 - chlorobenzylamino)-1,4-dihydroquinoline in free base form is obtained from the hydrochloride by reaction with aqueous sodium hydroxide solution following the procedure described above in Example 43(B).

EXAMPLE 45

*7-Chloro-1-(4-Chlorobenzyl)-4-(2,4-Dichlorobenzylimino)-1,4-Dihydroquinoline Hydrochloride*

Following the procedure described in Example 43(B) using 4 g. of 7-chloro-4-(2,4-dichlorobenzylamino)quinoline, 9.7 g. of 4-chlorobenzyl chloride and 100 cc. of acetonitrile, there was obtained 3.7 g. of 7-chloro-1-(4-chlorobenzyl)-4-(2,4-dichlorobenzylimino)-1,4 - dihydroquinoline hydrochloride, M.P. 268.4–270.6° C. (corr.) when recrystallized from ethanol.

*Analysis.*—Calcd. for $C_{23}H_{16}Cl_4N_2.HCl$: $Cl^-$, 7.12; N, 5.62. Found: $Cl^-$, 7.12; N, 5.70.

7-chloro-1-(4-chlorobenzyl) - 4 - (2,4 - dichlorobenzylimino)-1,4-dihydroquinoline in free base form is obtained from the hydrochloride by reaction with aqueous sodium hydroxide solution following the procedure described above in Example 43(B).

EXAMPLE 46

*5-Chloro-1-(4-Chlorobenzyl)-4-(2,4-Dichlorobenzylimino)-1,4-Dihydroquinoline Hydrochloride*

Following the procedure described in Example 43(B) using 10 g. of 5-chloro-4 - (2,4 - dichlorobenzylamino)quinoline, 24 g. of 4-chlorobenzyl chloride and 225 cc. of acetonitrile, there was obtained 11.4 g. of 5-chloro-1-(4-chlorobenzyl)-4-(2,4-dichlorobenzylimino)-1,4 - dihydroquinoline hydrochloride, M.P. 244.6–247.0° C. (corr.) when recrystallized from ethanol.

*Analysis.*—Calcd. for $C_{23}H_{16}Cl_4N_2.HCl$: $Cl^-$, 7.12; N, 5.62. Found: $Cl^-$, 6.90; N, 5.45.

5-chloro-1-(4-chlorobenzyl)-4-(2,4 - dichlorobenzylimino)-1,4-dihydroquinoline in free base form is obtained from the hydrochloride by reaction with aqueous sodium hydroxide solution following the procedure described above in Example 43(B).

EXAMPLE 47

*1-Benzyl-4-Benzylimino-1,4-Dihydroquinoline Hydrochloride*

Following the procedure described in Example 43(B) using 10 g. of 4-benzylaminoquinoline, 27 g. of benzyl chloride and 225 cc. of acetonitrile, there was obtained 12.3 g. of 1-benzyl-4-benzylimino-1,4-dihydroquinoline hydrochloride, M.P. 287.4–293.4° C. (corr.) with decomposition.

*Analysis.*—Calcd. for $C_{23}H_{20}N_2.HCl$: $Cl^-$, 9.84; N, 7.76. Found: $Cl^-$, 9.71; N, 7.60.

1-benzyl-4-benzylimino-1,4-dihydroquinoline in free base form is obtained from the hydrochloride by reaction with aqueous sodium hydroxide solution following the procedure described above in Example 43(B).

EXAMPLE 48

*1-Benzyl-4-(Chlorobenzylimino)-2-Methyl-1,4-Dihydroquinoline Hydrochloride*

Following the procedure described in Example 43(B) using 2 g. of 4-(4-chlorobenzylamino)-2-methylquinoline, 4 g. of benzyl chloride and 50 cc. of acetonitrile, there was obtained 2.4 g. of 1-benzyl-4-(4-chlorobenzylimino)-2-methyl-1,4-dihydroquinoline hydrochloride as a monohydrate, M.P. 268.0–271.4° C. (corr.) when recrystallized from ethanol.

*Analysis.*—Calcd. for $C_{24}H_{21}ClN_2.HCl.H_2O$: $Cl^-$, 8.28; N, 6.58; $H_2O$, 4.22. Found: $Cl^-$, 8.20; N, 6.58; $H_2O$, 4.24.

1 - benzyl - 4 - (4 - chlorobenzylimino) - 2 - methyl-1,4-dihydroquinoline in free base form is obtained from the hydrochloride by reaction with aqueous sodium hydroxide solution following the procedure described above in Example 43(B).

EXAMPLE 49

*1-Benzyl-7-Chloro-4-(4-Chlorobenzylimino)-1,4-Dihydroquinoline Hydrochloride*

Following the procedure described in Example 43(B) using 9 g. of 7-chloro-4-(4-chlorobenzylamino)quinoline, 22 g. of benzyl chloride and 225 cc. of acetonitrile, there was obtained 9.4 g. of 1-benzyl-7-chloro-4-(4-chlorobenzylimino)-1,4-dihydroquinoline hydrochloride, M.P. 274.8–280.6° C. (corr.) when recrystallized from ethanol.

*Analysis.*—Calcd. for $C_{23}H_{18}Cl_2N_2.HCl$: $Cl^-$, 8.25; N, 6.50. Found: $Cl^-$, 8.12; N, 6.45.

1 - benzyl - 7 - chloro - 4 - (4 - chlorobenzylimino)-1,4-dihydroquinoline in free base form is obtained from the hydrochloride by reaction with aqueous sodium hydroxide solution following the procedure described above in Example 43(B).

EXAMPLE 50

*1-Benzyl-7-Chloro-4-(2,4-Dichlorobenzylimino)-1,4-Dihydroquinoline Hydrochloride*

Following the procedure described in Example 43(B) using 4 g. of 7-chloro-4-(2,4-dichlorobenzylamino)quinoline, 7.5 g. of benzyl chloride and 100 cc. of acetonitrile, there was obtained 2.3 g. of 1-benzyl-7-chloro-4-(2,4-dichlorobenzylimino)-1,4-dihydroquinoline hydrochloride, M.P. 275.2–278.0° C. (corr.) when recrystallized from ethanol.

*Analysis.*—Calcd. for $C_{23}H_{17}Cl_3N_2.HCl$: $Cl^-$, 7.65; N, 6.04. Found: $Cl^-$, 7.30; N, 5.91.

1 - benzyl - 7 - chloro - 4 - (2,4 - dichlorobenzylimino)-1,4-dihydroquinoline in free base form is obtained from the hydrochloride by reaction with aqueous sodium hydroxide solution following the procedure described above in Example 43(B).

EXAMPLE 51

*1-Benzyl-5-Chloro-4-(2,4-Dichlorobenzylimino)-1,4-Dihydroquinoline Hydrochloride*

Following the procedure described in Example 43(B) using 10 g. of 5-chloro-4-(2,4-dichlorobenzylamino)quinoline, 19 g. of benzyl chloride and 225 cc. of acetonitrile, there was obtained 7.9 g. of 1-benzyl-5-chloro-4-(2,4-dichlorobenzylimino)-1,4-dihydroquinoline hydrochloride, M.P. 234.4–242.6° C. (corr.) when recrystallized from isopropyl alcohol-ethanol.

*Analysis.*—Calcd. for $C_{23}H_{17}Cl_3N_2.HCl$: $Cl^-$, 7.65; N, 6.04. Found: $Cl^-$, 7.54; N, 5.89.

1 - benzyl - 5 - chloro - 4 - (2,4 - dichlorobenzylimino)-1,4-dihydroquinoline in free base form is obtained from the hydrochloride by reaction with aqueous sodium hydroxide solution following the procedure described above in Example 43(B).

EXAMPLE 52

*1-Benzyl-4-(2,4-Dichlorobenzylimino)-6-Methoxy-1,4-Dihydroquinoline Hydrochloride*

Following the procedure described in Example 43(B) using 10 g. of 4-(2,4-dichlorobenzylamino)-6-methoxyquinoline, 19 g. of benzyl chloride and 200 cc. of acetonitrile, there was obtained 6.8 g. of 1-benzyl-4-(2,4-dichlorobenzylimino)-6-methoxy-1,4-dihydroquinoline hydrochloride, M.P. 265.0–268.4° C. (corr.) with decomposition when recrystallized from ethanol.

*Analysis.*—Calcd. for $C_{24}H_{20}Cl_2N_2O \cdot HCl$: Cl−, 7.72; N, 6.08. Found: Cl−, 7.56; N, 6.07.

1 - benzyl - 4 - (2,4 - dichlorobenzylimino) - 6 - methoxy-1,4-dihydroquinoline in free base form is obtained from the hydrochloride by reaction with aqueous sodium hydroxide solution following the procedure described above in Example 43(B).

EXAMPLE 53

*7-Chloro-1-(3-Chlorobenzyl)-4-(4-Chlorobenzylimino)-1,4-Dihydroquinoline Hydrochloride*

Following the procedure described in Example 43(B) using 9 g. of 7-chloro-4-(4-chlorobenzylamino)quinoline, 24 g. of 3-chlorobenzyl chloride and 200 cc. of acetonitrile, there was obtained 8.7 g. of 7-chloro-1-(3-chlorobenzyl) - 4 - (4 - chlorobenzylimino) - 1,4 - dihydroquinoline hydrochloride, M.P. 256.6–261.6° C. (corr.) when recrystallized from ethanol.

*Analysis.*—Calcd. for $C_{23}H_{17}Cl_3N_2 \cdot HCl$: Cl, 30.60; N, 6.04. Found: Cl, 30.64; N, 6.04.

7 - chloro - 1 - (3 - chlorobenzyl) - 4 - (4 - chlorobenzylimino)-1,4-dihydroquinoline in free base form is obtained from the hydrochloride by reaction with aqueous sodium hydroxide solution following the procedure described above in Example 43(B).

EXAMPLE 54

*7-Chloro-4-(4-Chlorobenzylimino)-1-(4-Nitrobenzyl)-1,4-Dihydroquinoline Hydrochloride*

Following the procedure described in Example 43(B) using 9 g. of 7-chloro-4-(4-chlorobenzylamino)quinoline, 5.2 g. of 4-nitrobenzyl chloride and 175 cc. of ethanol, there was obtained 4.7 g. of 7-chloro-4-(4-chlorobenzylimino)-1-(4-nitrobenzyl)-1,4-dihydroquinoline hydrochloride, M.P. 276.8–278.4° C. (corr.) with decomposition when recrystallized from ethanol.

*Analysis.*—Calcd. for $C_{23}H_{17}Cl_2N_3O_2 \cdot HCl$: Cl, 22.41; N, 8.85. Found: Cl, 22.45; N, 9.02.

7 - chloro - 4 - (4 - chlorobenzylimino) - 1 - (4 - nitrobenzyl)-1,4-dihydroquinoline in free base form is obtained from the hydrochloride by reaction with aqueous sodium hydroxide solution following the procedure described above in Example 43(B).

Other 1-[(lower-aromatic)-(lower-alkyl)]-4-[(lower-aromatic)-(lower-alkyl)imino]-1,4-dihydroquinolines that can be prepared following the above procedure described in Example 43(B) using the appropriate 4-[(lower-aromatic)-(lower-alkyl)amino]quinoline and (lower-aromatic)-(lower-alkyl) ester of a strong acid include those compounds given in Examples 55–69, inclusive.

EXAMPLE 55

1-benzyl-7-chloro-4-(4-fluorobenzylimino) - 1,4 - dihydroquinoline hydrochloride is obtained following the procedure described in Example 43(B) using 7-chloro-4-(4-fluorobenzylamino)quinoline and benzyl chloride.

EXAMPLE 56

7-chloro-4-(1-naphthylmethylimino) - 1 - (2,4,6-triiodobenzyl)-1,4-dihydroquinoline hydriodide is obtained following the procedure described in Example 43(B) using 7-chloro-4-(1-naphthylmethylamino)quinoline and 2,4,6-triiodobenzyl iodide.

EXAMPLE 57

4-(4-biphenylylmethylimino) - 7 - chloro - 1 - [4 - (2-chlorophenyl)butyl]-1,4-dihydroquinoline hydrochloride is obtained following the procedure described in Example 43(B) using 4-(4-biphenylylmethylamino)-7-chloroquinoline and 4-(2-chlorophenyl)butyl chloride.

EXAMPLE 58

1-(2-bromobenzyl) - 7 - chloro - 4 - (2 - thienylmethylimino)-1,4-dihydroquinoline hydrobromide is obtained following the procedure described in Example 43(B) using 7-chloro-4-(2-thienylmethylamino)quinoline and 2-bromobenzyl bromide.

EXAMPLE 59

7-chloro-1-(3-fluorobenzyl)-4 - (2 - furylmethylimino)-1,4-dihydroquinoline hydrochloride is obtained following the procedure described in Example 43(B) using 7-chloro-4-(2-furylmethylamino)quinoline and 3-fluorobenzyl chloride.

EXAMPLE 60

7-chloro-4-(5-chloro - 2 - pyridylmethylimino) - 1 - (2-phenylethyl)-1,4-dihydroquinoline hydrochloride is obtained following the procedure descrbied in Example 43(B) using 7-chloro-4-(5-chloro-2-pyridylamino)quinoline and 2-phenylethyl chloride.

EXAMPLE 61

7-chloro-1-(2-methylmercaptobenzyl) - 4 - (2 - pyrimidylmethylimino)-1,4-dihydroquinoline hydrochloride is obtained following the procedure described in Example 43(B) using 7-chloro-4-(2-pyrimidylmethylamino)quinoline and 2-methylmercaptobenzyl chloride.

EXAMPLE 62

1-(4-n-butoxybenzyl) - 7 - chloro - 4 - [4 - (4 - chlorophenyl)butylimino]-1,4-dihydroquinoline hydriodide is obtained following the procedure described in Example 43(B) using 7-chloro-4-[4-(4-chlorophenyl)butylamino]-quinoline and 4-n-butoxybenzyl iodide.

EXAMPLE 63

4-(4-n-butoxybenzylimino)-6,7-dichloro - 1 - (2 - naphthylmethyl)-1,4-dihydroquinoline hydrobromide is obtained following the procedure described in Example 43(B) using 4-(4-n-butoxybenzylamino)-6,7-dichloroquinoline and 2-naphthylmethyl bromide.

EXAMPLE 64

1-(4-biphenylylmethyl-3-nitro - 4(4 - n-propylsulfonylbenzylimino)-1,4-dihydroquinoline hydrochloride is obtained following the procedure described in Example 43(B) using 3 nitro-4-(4-n-propylsulfonylbenzylamino)-quinoline and 4-biphenylylmethyl chloride.

EXAMPLE 65

7-chloro-4-(2-methylmercaptobenzylimino) - 3 - nitro-1-(2-thienylmethyl)-1,4-dihydroquinoline hydrochloride is obtained following the procedure described in Example 43(B) using 7-chloro-4-(2-methylmercaptobenzylamino)-3-nitroquinoline and 2-thienylmethyl chloride.

EXAMPLE 66

4-(2-chloro-4-n-propoxybenzylimino) - 1 - (2 -furylmethyl)-7-trifluoromethyl-1,4 - dihydroquinoline hydrochloride is obtained following the procedure described in Example 43(B) using 4-(2-chloro-4-n-propoxybenzylamino)-7-trifluoromethylquinoline and 2 - furylmethyl chloride.

EXAMPLE 67

4-(4-n-amylaminobenzylimino)-6,8 - dimethoxy - 1 - (3-pyridylmethyl)-1,4-dihydroquinoline hydrochloride is obtained following the procedure described in Example 43(B) using 4-(4-n-amylaminobenzylamino)-6,8-dimethoxyquinoline and 3-pyridylmethyl chloride.

EXAMPLE 68

7-methylmercapto-1-(2-pyrimidylmethyl) - 4 - (3 - trifluoromethylbenzylimino)-1,4 - dihydroquinoline hydrochloride is obtained following the procedure described in Example 43(B) using 7-methylmercapto-4-(3-trifluoromethylbenzylamino)quinoline and 2 - pyrimidylmethyl chloride.

EXAMPLE 69

1-(2,4-dibromobenzyl)-7 - methyl - 4 - (4 - propionylaminobenzylimino)-1,4-dihydroquinoline hydrobromide is obtained following the procedure described in Example 43(B) using 7-methyl-4-(4-propionylaminobenzylamino)-quinoline and 2,4-dibromobenzyl bromide.

The compounds of Examples 55–69, inclusive, can be converted into their free base form by reaction with an acid-acceptor according to the procedure given in Example 1(B) for the conversion of 1-benzyl-7-chloro-4-(3-chlorobenzylimino)-1,4-dihydroquinoline hydrochloride into 1-benzyl-7-chloro-4-(3-chlorobenzylimino)-1,4-dihydroquinoline by reaction with aqueous sodium hydroxide solution.

Chemotherapeutic evaluation of the 1-[(lower-aromatic)-(lower-alkyl)]-4-[(lower-aromatic) - (lower - alkyl)-imino]-1,4-dihydroquinolines and acid-addition salts of the foregoing examples has demonstrated that they are useful as anthelmintic agents. When administered orally to Swiss mice infected with the tapeworm *Hymenolepis nana*, the compounds completely cured the animals of the infection at dosage levels as low as 25 mg. per kg. of body weight per day. Some of the compounds, for instance, 1-benzyl-4-benzylimino-7-chloro-1,4 - dihydroquinoline hydrochloride, 1-benzyl-7-chloro-4-(3-chlorobenzylimino)-1,4-dihydroquinoline hydrochloride, 1-benzyl-7-chloro-4-(4-chlorobenzylimino)-1,4 - dihydroquinoline hydrochloride, 1-benzyl-7-chloro-4-(3,4-dichlorobenzylimino)-1,4-dihydroquinoline hydrochloride, 7-chloro-1-(3-chlorobenzyl)-4-(4-chlorobenzylimino) - 1,4 - dihydroquinoline hydrochloride and 7-chloro-1-(4-chlorobenzyl)-4-(4-chlorobenzylimino)-1,4-dihydroquinoline hydrochloride, have $ED_{50}$ values below about 10 mg. per kg. per day, $ED_{50}$ meaning the effective dose necessary to clear 50% of the Swiss mice of the tapeworm infection.

My new 1-[(lower-aromatic)-(lower-alkyl)]-4-[(lower-aromatic)-(lower-alkyl)imino]-1,4 - dihydroquinolines and acid-addition salts can be prepared for use by incorporating them in syrup, tablet, or capsule form for oral administration. They can be formulated in the same manner as known compounds having anthelmintic properties such as phenothiazine, piperazine citrate, and the like.

I claim:

1. A composition of matter selected from the group consisting of: (*a*) the 1 - [(lower - aromatic) - (lower - alkyl)] - 4 - [(lower - aromatic) - (lower - alkyl)imino] - 1,4-dihydroquinoline having the structural formula

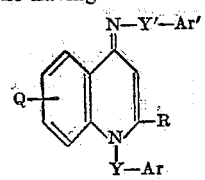

where Q is selected from the group consisting of hydrogen and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Y and Y' are each lower-alkylene, Ar and Ar' are each aromatic radicals selected from the group consisting of phenyl, naphthyl, biphenylyl, thienyl, furyl, pyridyl and pyrimidyl, and R is a member selected from the group consisting of hydrogen and lower-alkyl; and, (*b*) acid-addition salts thereof.

2. The 1 - arylmethyl - 4 - arylmethylimino - 7 - halo - 1,4-dihydroquinoline having the structural formula

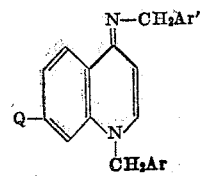

where Q is halo, and Ar and Ar' are each monocarbocyclic-aryl having six ring-carbon atoms.

3. The acid-addition salt of the compound of claim 2.

4. 7 - chloro - 1 - (2 - chlorobenzyl) - 4 - (4 - chlorobenzylimino)-1,4-dihydroquinoline.

5. 7 - chloro - 1 - (3 - chlorobenzyl) - 4 - (4 - chlorobenzylimino)-1,4-dihydroquinoline hydrochloride.

6. 7 - chloro - 1 - (4 - chlorobenzyl) - 4 - (4 - chlorobenzylimino)-1,4-dihydroquinoline hydrochloride.

7. 1 - benzyl - 7 - chloro - 4 - (3 - chlorobenzylimino) - 1,4-dihydroquinoline hydrochloride.

8. 1 - benzyl - 7 - chloro - 4 - (4 - chlorobenzylimino) - 1,4-dihydroquinoline hydrochloride.

9. 1 - benzyl - 4 - benzylimino - 7 - chloro - 1,4 - dihydroquinoline hydrochloride.

10. 1 - benzyl - 7 - chloro - 4 - (2,4 - dichlorobenzyl - imino)-1,4-dihydroquinoline hydrochloride.

11. 1 - benzyl - 7 - chloro - 4 - (3,4 - dichlorobenzyl - imino)-1,4-dihydroquinoline hydrochloride.

12. A process for the preparation of the acid-addition salt of the 1 - [(lower - aromatic) - (lower - alkyl)] - 4 - [(lower - aromatic) - (lower - alkyl)imino] - 1,4 - dihydroquinoline having the structural formula

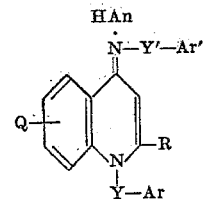

where Q is selected from the group consisting of hydrogen and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Y and Y' are each lower-alkylene, Ar and Ar' are each aromatic radicals selected from the group consisting of phenyl, naphthyl, biphenylyl, thienyl, furyl, pyridyl and pyrimidyl, R is a member selected from the group consisting of hydrogen and lower-alkyl, and An is an anion of a strong acid, which comprises reacting the corresponding 4 - [(lower - aromatic) - (lower - alkyl)amino] - quinoline having the formula

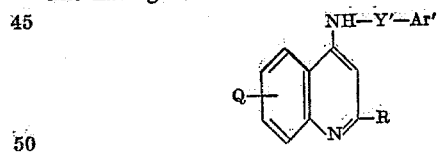

where Q, Y', Ar' and R have the meanings already designated, with an ester having the formula Ar—Y—An.

13. A process for the preparation of the acid-addition salt of the 1 - arylmethyl - 4 - arylmethylimino - 7 - halo - 1,4-dihydroquinoline having the structural formula

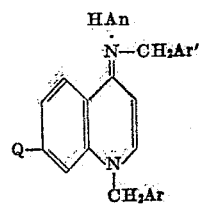

where Q is halo, Ar and Ar' are each monocarbocyclic-aryl having six ring-carbon atoms and An is an anion of a strong acid, which comprises reacting the corresponding 4-arylmethylamino-7-haloquinoline with an ester having the formula ArCH₂—An.

14. A process for the preparation of the hydrohalide of the 1 - [(lower - aromatic) - (lower - alkyl)] - 4 - [(lower - aromatic) - (lower - alkyl)imino] - 1,4 - dihy - droquinoline which in free base form has the structural formula

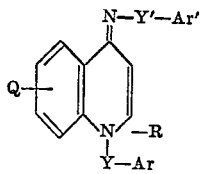

where Q is selected from the group consisting of hydrogen and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Y and Y' are each lower-alkylene, Ar and Ar' are each aromatic radicals selected from the group consisting of phenyl, naphthyl, biphenylyl, thienyl, furyl, pyridyl and pyrimidyl, and R is a member selected from the group consisting of hydrogen and lower-alkyl, which comprises reacting a 4-haloquinolinium halide having the formula

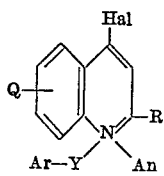

where Q, R, Y and Ar have the meanings already given, Hal is a member selected from the group consisting of chloro, bromo and iodo, and An is a halide ion, with a (lower-aromatic)-(lower-alkyl)-amine having the formula Ar'—Y'—NH$_2$.

15. A process for the preparation of the 1-arylmethyl-4-arylmethylimino-1,4-dihydroquinoline hydrohalide having the structural formula

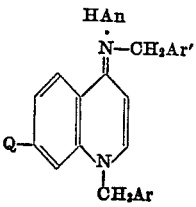

where Q is halo, An is a halide ion, and Ar and Ar' are each monocarbocyclic-aryl having six ring-carbon atoms, which comprises reacting the corresponding 1-arylmethyl-4,7-dihaloquinolinium halide with an arylmethylamine having the formula Ar'—CH$_2$NH$_2$.

16. A process for the preparation of the 1-[(lower-aromatic) - (lower - alkyl)] - 4 - [(lower - aromatic) - (lower - alkyl)imino] - 1,4 - dihydroquinoline having the structural formula

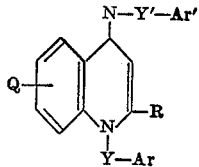

where Q is selected from the group consisting of hydrogen and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Y and Y' are each lower-alkylene, Ar and Ar' are each aromatic radicals selected from the group consisting of phenyl, naphthyl, biphenylyl, thienyl, furyl, pyridyl and pyrimidyl and R is a member selected from the group consisting of hydrogen and lower-alkyl, which comprises reacting the corresponding acid-addition salt with an acid-acceptor.

References Cited in the file of this patent
UNITED STATES PATENTS

| | | |
|---|---|---|
| 2,419,199 | Burckhalter et al. | Apr. 22, 1947 |
| 2,526,417 | Reitsema | Oct. 17, 1950 |
| 2,554,737 | Haefliger et al. | May 29, 1951 |
| 2,940,974 | Surrey | June 14, 1960 |

OTHER REFERENCES

Ochiari: Chem. Abstracts, p. 6637, vol. 45 (1951).
Elderfield: Heterocyclic Compounds, vol. 4, pages 167–168, John Wiley and Sons, 1952.
Gopalchari: Chem. Abstracts, vol. 49, p. 3967 (1955).
Schock: Journal Amer. Chem. Soc., pp. 1670–72 (1957), vol. 79.

UNITED STATES PATENT OFFICE
CERTIFICATE OF CORRECTION

Patent No. 3,075,984　　　　　　　　　　　January 29, 1963

Alexander R. Surrey

It is hereby certified that error appears in the above numbered patent requiring correction and that the said Letters Patent should read as corrected below.

Column 1, lines 15 and 16, for "-aromatic)-lower-" read -- -aromatic)-(lower- --; column 2, line 17, after "biphenylyl" insert a comma; column 4, lines 47 and 48, for "-aromatic)-lower-" read -- -aromatic)-(lower- --; column 6, line 75, for "4,7-diido-1-" read -- 4,7-diiodo-1- --; column 10, line 32, for "hydriode" read -- hydriodide --; line 54, for "-(2methyl-" read -- -(2-methyl- --; column 11, line 25, for "hydrioxide" read -- hydroxide --; line 46, for "hydriode" read -- hydriodide --; column 14, line 10, for "methylforamide" read -- methylformamide --; line 23, for "-(2-furylmethylamino-quino-" read -- -(2-furylmethylamino)quino- --; line 67, for "-(2,4-dichlorobenzylamino)-" read -- -(2,4-dichlorobenzylimino)- --; column 15, line 8, for "-(4-chlorobenzyl-4-(4-chlorobenzylamino)-" read -- -(4-chlorobenzyl)-4-(4-chlorobenzylimino)- --; line 69, for "-(Chlorobenzylimino)-", in italics, read -- -(4-Chlorobenzylimino)- --, in italics; column 21, lines 3 to 9, the formula should appear as shown below instead of as in the patent:

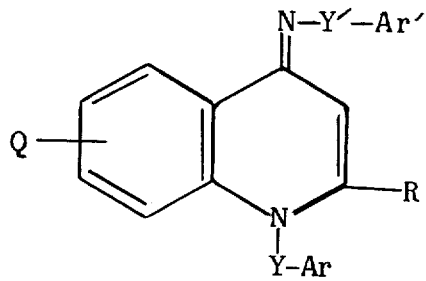

Signed and sealed this 19th day of November 1963.

(SEAL)
Attest:

ERNEST W. SWIDER
Attesting Officer

EDWIN L. REYNOLDS
Acting Commissioner
of Patents